(12) United States Patent
Chew et al.

(10) Patent No.: US 6,695,208 B1
(45) Date of Patent: Feb. 24, 2004

(54) SYSTEM FOR MONITORING A CHARACTERISTIC OF A PRODUCT

(75) Inventors: Song Kim Chew, Singapore (SG); Stanley Theng Seng Chia, Singapore (SG)

(73) Assignee: BuildNow PTE LTD (SG)

( * ) Notice: Subject to any disclaimer, the term of this patent is extended or adjusted under 35 U.S.C. 154(b) by 0 days.

(21) Appl. No.: 10/111,824
(22) PCT Filed: Oct. 29, 1999
(86) PCT No.: PCT/SG99/00107
§ 371 (c)(1), (2), (4) Date: Apr. 26, 2002
(87) PCT Pub. No.: WO01/31504
PCT Pub. Date: May 3, 2001
(51) Int. Cl.[7] .................................. G06F 17/60
(52) U.S. Cl. ........................ 235/385; 235/487
(58) Field of Search ................. 235/385, 375, 235/462.01, 487, 492; 73/54.03

(56) References Cited

U.S. PATENT DOCUMENTS

| | | | | |
|---|---|---|---|---|
| 4,615,215 A | * | 10/1986 | Sugimoto et al. | 73/54.03 |
| 4,654,514 A | | 3/1987 | Watson et al. | 235/385 |
| 5,493,107 A | | 2/1996 | Gupta et al. | 235/383 |
| 5,774,875 A | * | 6/1998 | Medeiros et al. | 235/375 |
| 5,948,970 A | * | 9/1999 | Te'eni | 73/54.03 |
| 5,962,834 A | | 10/1999 | Markman | 235/385 |

* cited by examiner

Primary Examiner—Daniel St. Cyr
(74) Attorney, Agent, or Firm—Foley & Lardner (57) ABSTRACT

A system for monitoring a characteristic of a product in a testing process. An information storage device stores information relating to the product. A writing mechanism is used for writing the information to the information storage device. A reading mechanism reads the information and stores information in a database. A testing system performs a test on the product to produce a test result. The test result is stored in the database so that the test result is associated with the information, whereafter the associated information and test result stored enable monitoring of the characteristic of the product.

32 Claims, 4 Drawing Sheets

SYSTEM FOR MONITORING A CHARACTERISTIC OF A PRODUCT

FIELD OF THE INVENTION

This invention relates to a system for monitoring a characteristic of a product and in particular to a system of monitoring a characteristic of concrete in a concrete testing process to thereby monitor the quality of supplied concrete.

BACKGROUND OF THE INVENTION

Presently, ready mixed concrete in produced at a batching plant and transported to a construction site by trucks. At the construction site, a sample of concrete is taken from one in about six trucks. The sample is subjected to the performance of a series of tests to monitor the quality of supplied concrete. The tests performed on a concrete sample are usually a slump test and a compression strength test. The sample of concrete is taken from the truck and wheelbarrowed into a "test cube making centre".

A slump test is performed on the sample of concrete and the result is recorded manually into a log book. A slump test is a measure of concrete workability. The test is performed by filling a specially shaped metal cone with concrete to be tested, removing the metal cone so that the cone of concrete partially subsides or slumps, and measuring the change of height of the concrete from the height of the top of the cone to the height of the top of the slumped concrete pile. Generally speaking, the greater the change in height, the greater the workability of the concrete.

To prepare the concrete for compression strength testing, about six test cubes of dimension of 150×150×150 mm are made. Normally, three of the test cubes are stored for seven days while three are stored for twenty-eight days. In the current system, when the test cubes are made, a written paper note which includes information such as the date the test cube was made, the grade of concrete, the test cube number and what load of concrete the test cube came from, is placed on top of the test cube while the test cube is still wet. The next day, when the concrete has cured, the mould used for making the concrete test cube is removed and the information from the note attached to the test cube is transcribed to the side of the test cube using a crayon or permanent marker.

After storing the test cubes for an appropriate number of days, the test cubes are tested for their compression strength and their measurements are recorded manually into the log book which contains the slump test results. In most cases, after the compression strength test is conducted, the test results are also manually entered into a computerised database.

Occasionally when the requirements for the concrete deviate from normal, adjustments are made to the testing conditions. For example, the test cube dimensions may need to be changed to 100×100×100 mm. In addition to the standard seven day and twenty-eight day compression strength tests, the test cubes might need to be tested for their two day, three day and/or fifty-six day strength. In this case, additional test cubes will need to be made for testing.

There a number of problems with the current testing system. Firstly, due to the manner in which information is recorded, information relating to the test results can be lost or interfered with. For example, as discussed above, information in recorded on paper notes which are placed on the concrete test cubes. While the information is usually written using a permanent marker, the data can be smudged or become faded if the note gets wet or dirty. Concrete test cubes are often submerged in water as part of the curing process adding to the likelihood of data being lost on other occasions, the note can become detached from the test cube and it is not always be possible to match a detached note to a particular test cube. Particularly, if more than one note becomes detached at the same time. As a result, when data identifying the test cube needs to be transferred onto the side of the test cube, the data can be distorted or lost.

Other errors arise due to errors in the transcription of data from the notes to the sides of the test cube.

Even if the data is transcribed accurately from the note to the side of the cube, it is possible for the writing on the side of the cube to become smudged or at least degraded sufficiently to make it hard to read to recover the data.

Furthermore, it is easy to tamper with the information on the note or on the side of the cube or when it is being entered into the log book. Thus, data might be changed in order to meet safety standards or to cut costs.

Further errors arise due to manual recording of the test cube data, slump tests and compression strength test results and also when the information is transferred from the log book to the computerised database. To attempt to improve the accuracy of the data it is often necessary for the data to be double checked which can consume time and increase the cost of the process.

Furthermore, in the current system it is necessary for both a client representative and a contractor to be present to witness the compression strength test. This is extremely resource intensive.

A further problem is that because of the delay between recording the data into a log book and transferring the data onto a computer database, the database is not readily accessible from the computerised database in a reasonable time frame for analytical purposes. Occasionally, the time is often increased because contractors tend to misplace log-books.

The above mentioned problems can have serious consequences in relation to monitoring the quality of concrete. It will be understood that it is important to ensure that concrete is of sufficient quality because there are potentially serious ramifications for the structure made from the concrete if the quality is inadequate. For example, if a compression strength test indicates that a particular batch of concrete is flawed to the extent that it may cause problems in the finished structure which employs the concrete, then it is important that such a result can be related to where the concrete has been used in the actual structure. If information relating to the particular test cube is lost or incorrect, it may not be possible to make this connection or the connection which is made may not be correct. Furthermore, as the current system requires manual entry of data, it is possible for the person entering the data to interfere with it and modify the test results when they do not meet safety criteria.

Embodiments of the present invention attempt to address the foregoing problems and at least to provide a system which is improved compared to the current system.

DISCLOSURE OF THE INVENTION

The invention provides a system for monitoring a characteristic of a product in a testing process, said system including:
  an information storage device for storing information relating to said product, said information storage device being separate from said product and adapted to be affixed to said product;

writing means for writing said information to said information storage device;

reading means for reading said information from said information storage device and storing said information in a database; and test means for performing a test on said product to produce a test result and storing said test result in said database so that it is associated with said information, whereafter the associated information and test result stored in said database enable monitoring of the characteristic of the product.

Preferably, said product is produced at a first location and transported to a second location before said information storage device is affixed to said product.

Preferably, said product is transported to said second location together with identification data associated with said product, and wherein said identification data is inputted to a memory of said writing means at said second location, said identification data being subsequently written to said information storage device by said writing means as at least part of said information.

Preferably, a preliminary test is conducted on said product at said second location and a preliminary test result of said preliminary test is inputted to said writing means, said preliminary test result being subsequently written to said information storage device by said writing means as at least part of said information.

Preferably, separate input means are provided for imputting said identification data and said preliminary test result to said writing means.

Preferably, said identification data is encoded in a bar code and said writing means includes a bar code reader to enable said identification data to be inputted to said writing means.

Preferably, said writing means includes a key pad and said key pad is used to input at least said preliminary test result.

Preferably, said writing means writes said information to said information storage device after said information storage device is affixed to said product.

Preferably, said writing means writes said information to said information storage device before said information storage device is affixed to said product.

Preferably, said system further includes storage means for storing said product after said information storage device has been affixed to said product and said information has been written to said information storage device, and wherein said product is retrieved from said storage means before said reading means reads said information.

Preferably, said product is in a first state when said product is produced and in a second state when said test is performed on said product.

Preferably, said product is concrete and the concrete is fluid in said first state and is solid in said second state.

Preferably, said concrete is formed into a test cube and said test is performed on a solid test cube.

Preferably, said preliminary test is a slump test.

Preferably, said test means performs a compression-strength test on said solid concrete.

Preferably, paid system includes weighing means for weighing said product before said test means performs said test and storing the weight of said product in said database go that the weight of said product is associated with said test result and said information.

Preferably, said reading means reads said information when said product in located in a testing position where said test means can perform said test.

Preferably, the information in said information storage device cannot be altered after the information is written to said information said storage device by said writing means.

Preferably, the information written to the information storage device includes a time at which said information written to said information storage device.

Preferably, said identification data includes at least one of:
a date delivery;
a time of delivery;
a customer name;
a location of a customer's site;
a product description;
a delivery note number;
an internal order number;
an internal vehicle number;
a register vehicle number;
a total amount ordered;
an amount of a load;
an amount of the total amount ordered which has delivered;
an amount of the total amount still to be delivered;
additional charges;
who issued the product; and
who ordered the product Preferably, the information written to the information storage device includes at least one of:
a date of making of a test cube;
a time of making of a test cube;
a slump test result;
a grade; and
a test cube number.

Preferably, said writing means generates a radio frequency information signal to write said information to said information storage device.

Preferably, said writing means is a hand held device.

Preferably, said reading means includes a reference signal generator and a receiver, and said information storage device includes retransmission means) wherein, in use, said reference signal generator generates a reference signal, said retransmission means alters said reference signal so that it contains the information stored on said information storage device to thereby produce an altered reference signal which is received by said receiver, whereafter said reading means extracts said information from said altered reference signal.

Preferably, said retransmission means is a passive device.

Preferably, said information means is a transponder.

Preferably, signals are radio frequency signals.

The invention also provides a system for testing concrete including using the above system for monitoring a characteristic of a product in a testing process, wherein the product is a sample of said concrete which is tested to thereby monitor said concrete.

Preferably, a plurality of samples are tested.

Preferably, the compression strength of said concrete is monitored.

Preferably, concrete from approximately one out of every six truckloads of concrete delivered to a site is tested.

Preferably, the slump test result of said concrete is monitored.

BRIEF DESCRIPTION OF THE DRAWINGS

An embodiment of the invention will now be described with reference to the accompanying drawings in which.

DESCRIPTION OF THE PREFERRED EMBODIMENT

In the preferred embodiment of the invention, the system for monitoring a characteristic of a product in a testing process is used in a system for testing concrete samples taken from one out of about six trucks of concrete delivered to a site in order to monitor the compression strength of the concrete.

Typically trucks from a batching plant transport ready-mix concrete to a clients project site daily. Before each trip is made, information, about the concrete produced at the batching plant is keyed into a computerised database at the batching plant. Some or all of this information is used to generate a delivery note having identification data including a delivery number. This delivery note is then sent with the concrete to the client's project site.

Typically, the information entered into the database includes:

the date of delivery;
the time of delivery; the customer's name;
the location of the customer's site;
a product description;
a delivery note number;
an internal order number;
an internal vehicle number;
a registered vehicle number;
a total amount ordered;
the amount of the load being delivered;
the amount of the total amount delivered so far;
the balance of the total amount ordered still to be delivered;
any additional charges;
who issued the concrete; and
who ordered the concrete.

Some or all of this information is printed as identification data onto a delivery note. In the preferred embodiment, a bar code encoding the delivery note number is printed onto the delivery note. However, other pieces of identification data can be either encoded in the bar code or in separate bar codes or included on the delivery note in some other manner.

Figure 1:
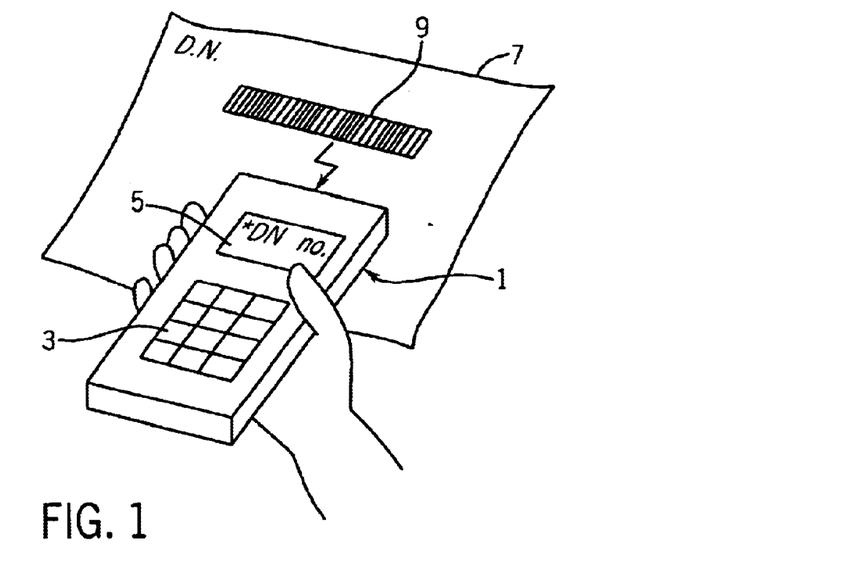
FIG. 1 illustrates one manner of inputting information to the writing means of the system of an embodiment of the invention.
Figure 2:
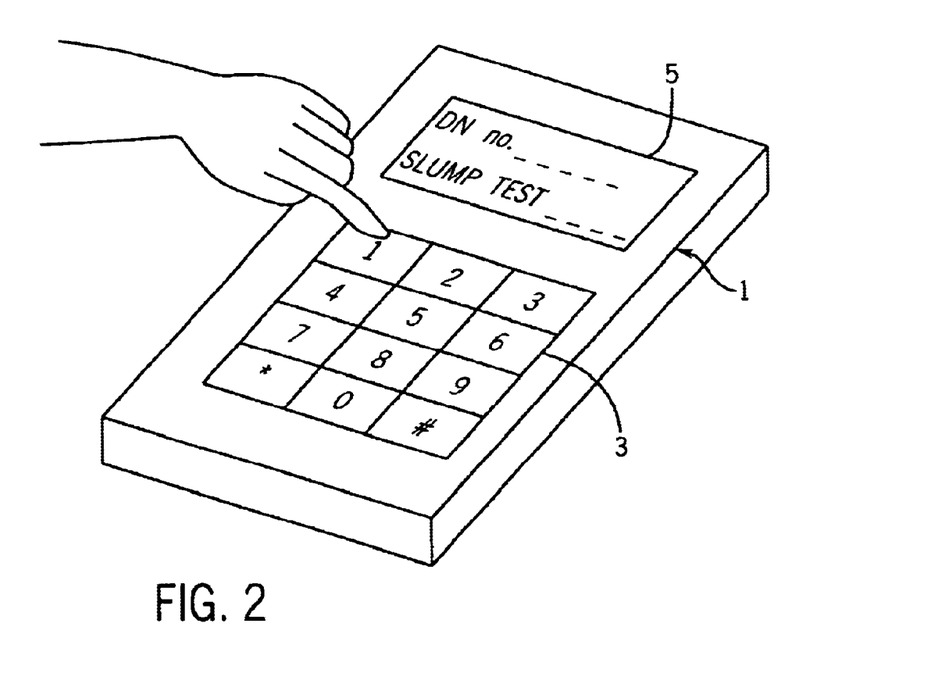
FIG. 2 illustrates another manner of inputting information to the writing means of FIG. 1.

When ready mix concrete trucks arrive at the project site, typically one out of every six trucks is chosen for inspection and testing. The truck that is chosen for testing proceeds to a test cube making centre area where a sample of concrete is taken from the truck. As shown in FIG. 1, at the teat cube making centre, a writing means in the form of a hand held device 1 is used to read identification data in the form of the delivery number encoded in bar code 9 from the delivery note 7 in the embodiment illustrated in FIG. 1, the hand held device 1 includes a bar code reader for reading the delivery note 7 to obtain the delivery note number and any other identification data contained in the bar code 9.

A preliminary teat such as a slump test is then conducted on the sampled concrete and the slump test result is keyed into the hand held device 1 by key pad 3. A slump test is a measure of concrete workability. The test is performed by filling a specially shaped metal cone with concrete to be tested, removing the metal cone so that the cone of concrete partially subsides or slumps, and measuring the change of height of the concrete from the height of the top of the cone to the height of the top of the slumped concrete pile. Generally speaking, the greater the change in height, the greater the workability of the concrete. Provided the concrete passes the slump test, the truck will then proceed to a casting location to cast the concrete.

Figure 3:
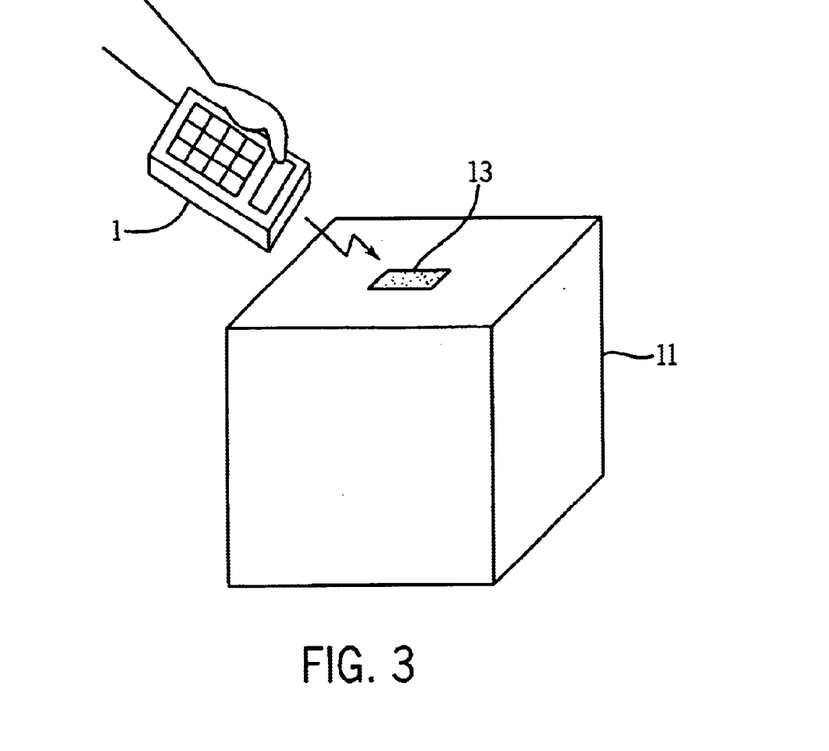
FIG. 3 shows the writing means of the system of an embodiment of the invention writing information to an information storage device affixed to a test cube.

At the cube making centre, about six test cubes 11 of dimensions 150×150×150 mm are made from the concrete sample. An information storage device in the form a tag 13 is attached to the top surface of each cube. In the preferred embodiment the tag 13 is a transponder or RPID device.

Further information can also be entered into the hand held device 1. For example, the grade of concrete and the cube number. This information is then written by the hand held device 1 to the tag 13 together with the delivery note number which was previously read from the delivery note 7 and the slump test result which was previously keyed in. The hand held device 1 also writes the date and time of cube making which is automatically generated by the internal clock system of the hand held device 1 when the device 1 is being used.

Figure 4:
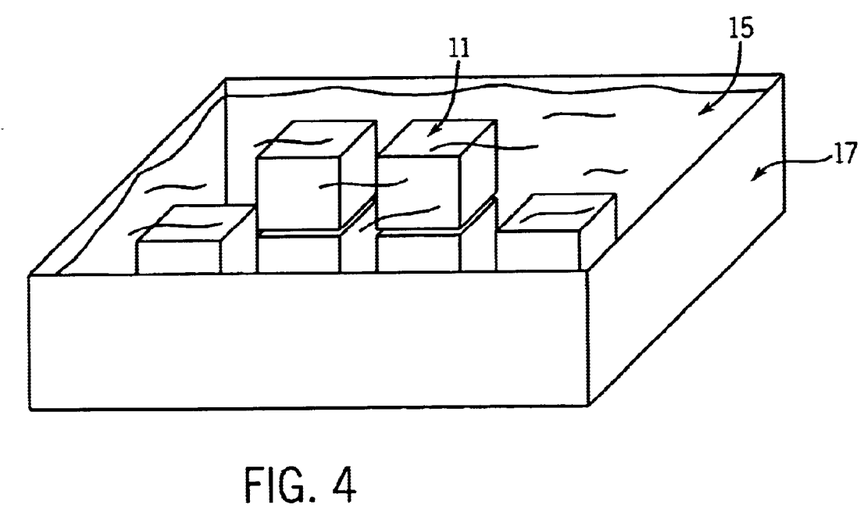
FIG. 4 shows a storage means of an embodiment of the invention for storing test cubes.

After the test cubes 11 are made, they are stored in a storage means in the form of a water tank 17 so that the cubes 11 are stored under water 15. The above steps are repeated for each truck that is sampled. When the test cubes 11 are ready to be tested for compression strength, whether this be at two, three, seven, twenty-eight or fifty-six days or some other convenient amount of days after they are made, the test cubes 11 are removed from the storage means 17 and taken to a testing lab. Typically, three test cubes 11 are tested at the same time to account for any testing errors.

Before the concrete test cubes 11 undergo compression strength testing, each test cube is weighed. A weighing means is linked to a computer database so that the weight of the test cube 11 is recorded automatically in an electronic database.

Figure 5:
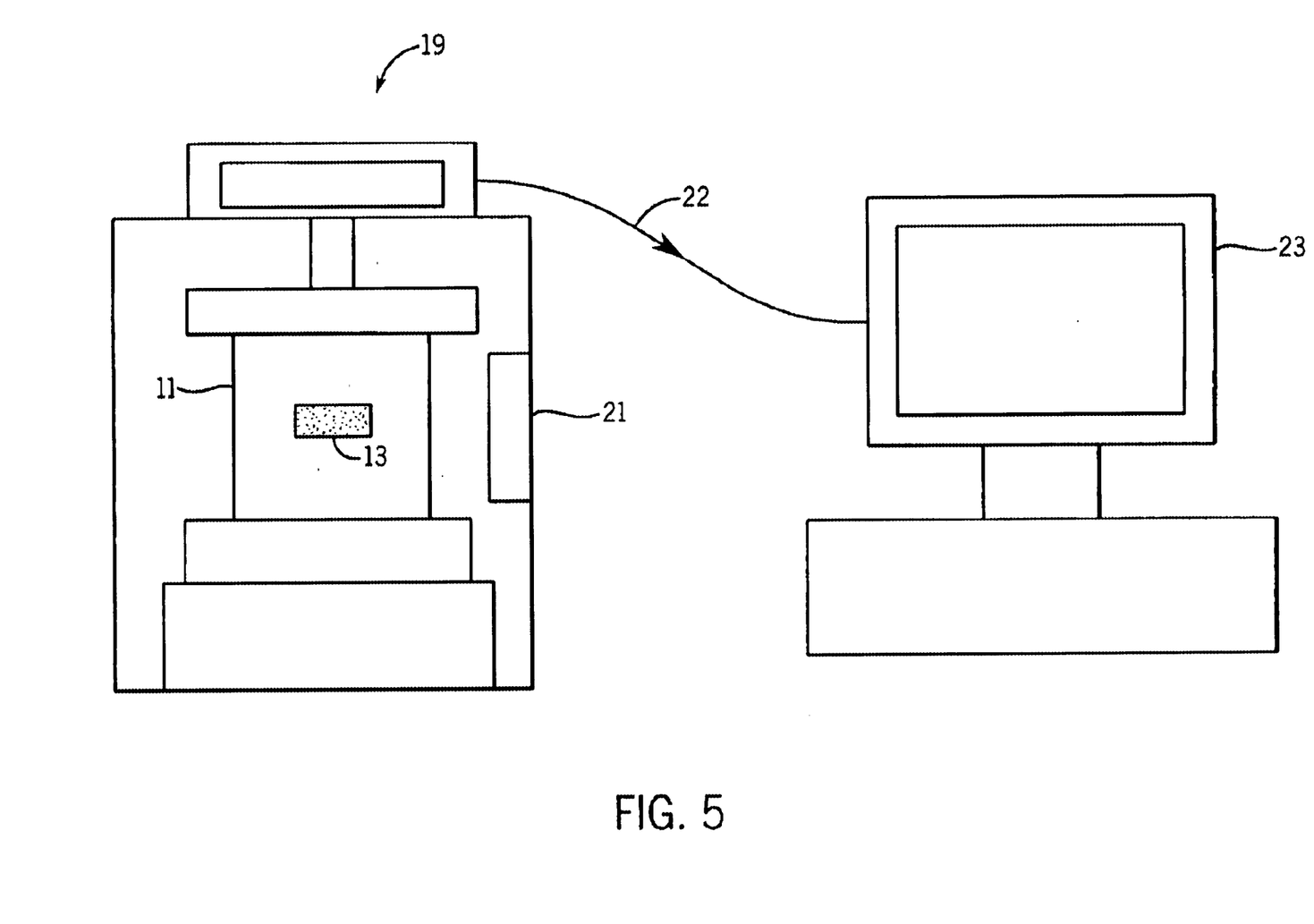
FIG. 5 is a schematic diagram showing how test results are transferred from a compression strength testing device to a database in accordance with an embodiment of a the invention.

After the test cube 11 is weighed, the test cube is placed on a testing means in the from of a compression-strength testing machine 19. The test cube 11 is placed so that the tag 13 is not on one of the two sides that are being compressed. In practice, this will not pose any problems because typically compression tests are performed on the smooth sides of the test cube 11 and the only rough side will be the side on which the tag 13 is placed.

A reading means 21 reads the information stored on the tag 13. The tag 13 is generally a passive device. The reading means 21 incorporates a generator for generating a reference signal and the tag 13 incorporates a retransmission means which alters and passively retransmits the reference signal so that it contains the information stored on the tag 13. The reading means 21 then receives the altered reference signal by using a receiver and extracts the information from the altered reference signal in a known manner. The information is then stored by the reading means 21 in the electronic database of computer 23 via datalink 22 80 that it is associated with the weight of the test cube 11 in the database.

The reading means 21 preferably reads the information before the compression test is started as there is a possibility that the tag 13 will be damaged during the compression strength test. The result of the compression strength 22 is also automatically. stored in the electronic database so that it is associated with the information extracted from the tag 13.

As stated previously, the information contained in the tag may include a wide variety of identification data. However, by setting up a communications link between the testing lab and the batching plant, it is possible for the computer to match the delivery note number extracted from the tag 13 with the delivery note number and concrete data stored in the computer at the batching plant. Once the delivery note numbers are matched, all concrete data pertaining to the test cube is compiled and stored together in a computer database at the test lab or elsewhere.

Therefore, the data collected at the test lab can include the following:
- the date of delivery;
- the time of delivery;
- the customer name;
- the location of the customers site;
- the product description;
- a delivery note number;
- an internal order number;
- an internal vehicle number;
- a registered vehicle number;
- a total amount ordered;
- the amount in the particular load;
- the progressive amount delivered;
- the balance to be delivered;
- the date of the cube making;
- the time of cube making;
- a delivery note number;
- a slump test result;
- a grade;
- a cube number;
- the weight of the test cube; and
- a compression strength test result.

Figure 6:
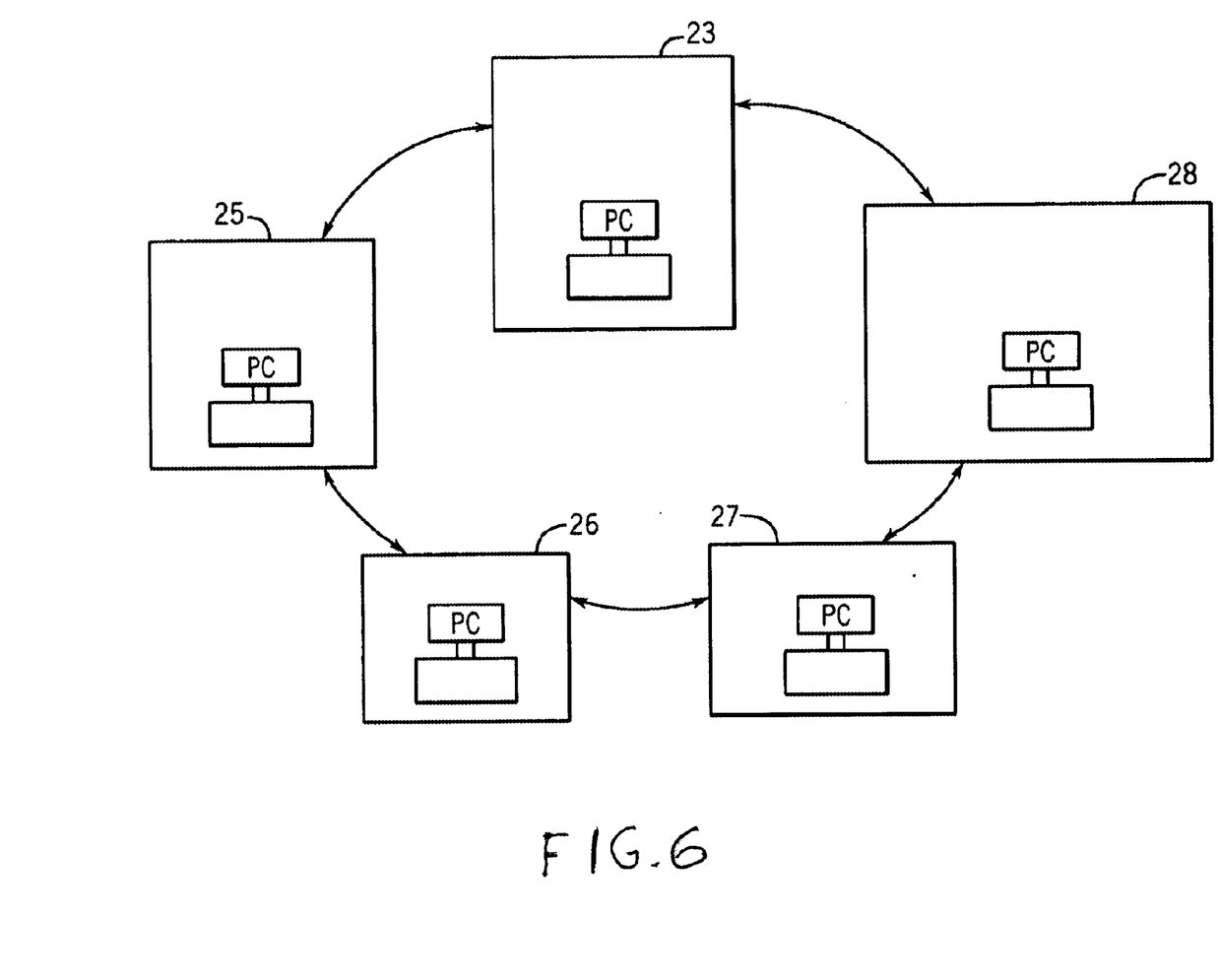
FIG. 6 is a schematic diagram illustrating how data relating to characteristics of the invention can be distributed according to an embodiment of the present invention.

Once all the test cube data is compiled it can also be made available via a communication network to the various parties with an interest in the test results. Any compression strength problems can thus be linked to a particular batch of concrete, thereby enabling remedial action to be taken if necessary. For example, referring to FIG. 6, PC 23 is a PC at the testing lab, PC 28 is a PC at the batching plant, PC 27 is a PC at the site office, PC 26 is a PC at the clients head office and PC 25 is a PC at the concrete manufacturers head office.

Analysis may be performed by comparing the compression strength test with the product description. For example, it may be found that a particular variation in amounts of various ingredients contained in the batch of concrete affects the compression strength.

Once tests are completed at other time intervals, for example twenty-eight day compression strength tests, these tests can also be associated with the previously obtained data.

The system clearly contains a number of advantageous over prior art systems.

Without human involvement in the recording of data, errors attributed to human error can be eliminated or at least substantially reduced. Similarly, labour costs can be lowered by automating the testing process.

Furthermore, as industrial environments such as construction sites are often dirty and wet, the use of a transponder to store information is extremely suitable as information contained in the transponder will not be damaged by dirt, oil or water. Furthermore, it is very difficult for any test results to be interfered with because a tag can be used which can be written to only once whereafter it becomes a read only device. Thus, in formation contained in the tag 13 cannot be changed or duplicated.

Furthermore, there is no need for physical contact between the transponder 13 and either the hand held device 1 or the reading means 21. This simplifies the procedure of writing the information to the information storage device and reading information from the information storage device. Furthermore, the device is not restricted to line of sight communication.

It will be appreciated by a person skilled in the art that various modifications could be made to the system described in the preferred embodiment without departing from the scope and spirit of the invention. For example, the information transferred by the hand held device to the transponder or tag 13 could be transferred prior to the tag 13 before the tag 13 is affixed to a test cube 11.

The claims defining the invention are as follows:

1. A system for monitoring a characteristic of a product in a testing process, said system including:
    an information storage device for storing information relating to said product, said information storage device being separate from said product and adapted to be affixed to said product;
    writing means for writing said information to said information storage device;
    reading means for reading said information from said information storage device and storing said information in a database; and
    test means for performing a test on said product to produce a test result and storing said test result in said database so that the test result is associated with said information, whereafter the associated information and test result stored in said database enable monitoring of the characteristic of the product,
    wherein said product is produced at a first location and transported to a second location before said information storage device is affixed to said product, and wherein said product is transported to said second location together with identification data associated with said product, and wherein said identification data is inputted to a memory of said writing means at said second location, said identification data being subsequently written to said information storage device by said writing means as at least part of said information.

2. The system as claimed in claim 1, wherein said writing means writes said information to said information storage device after said information storage device is affixed to said product.

3. The system as claimed in claim 1, wherein said writing means writes said information to said information storage device before said information storage device is affixed to said product.

4. The system as claimed in claim 3, wherein said system further includes storage means for storing said product after said information storage device has been affixed to said product and said information has been written to said information storage device, and wherein said product is retrieved from said storage means before said reading means reads said information.

5. A system for monitoring a characteristic of a product in a testing process, said system including:
- an information storage device for storing information relating to said product, said information storage device being separate from said product and adapted to be affixed to said product;
- writing means for writing said information to said information storage device;
- reading means for reading said information from said information storage device and storing said information in a database; and
- test means for performing a test on said product to produce a test result and storing said test result in said database so that the test result is associated with said information, whereafter the associated information and test result stored in said database enable monitoring of the characteristic of the product,
- wherein said product is produced at a first location and transported to a second location before said information storage device is affixed to said product, and wherein a preliminary test is conducted on said product at said second location and a preliminary test result of said preliminary test is inputted to said writing means, said preliminary test result being subsequently written to said information storage device by said writing means as at least part of said information.

6. The system as claimed in claim 5, wherein separate input means are provided for inputting said identification data and said preliminary test result to said writing means.

7. The system as claimed in claim 5, wherein said identification data is encoded in a bar code and said writing means includes a bar code reader to enable said identification data to be inputted to said writing means.

8. The system as claimed in claim 5, wherein said writing means includes a key pad and said key pad is used to input at least said preliminary test result.

9. The system as claimed in claim 3, wherein said writing means writes said information to said storage device after said information storage device is affixed to said product.

10. A system as for monitoring a characteristic of a product in a testing process, said system including:
- an information storage device for storing information relating to said product, said information storage device being separate from said product and adapted to be affixed to said product;
- writing means for writing said information to said information storage device;
- reading means for reading said information from said information storage device and storing said information in a database;
- test means for performing a test on said product to produce a test result and storing said test result in said database so that the test result is associated with said information, whereafter the associated information and test result stored in said database enable monitoring of the characteristic of the product; and
- storage means for storing said product after said information storage device has been affixed to said product and said information has been written to said information storage device;
- wherein said writing means writes said information to said, information storage device before said information storage device is affixed to said product, wherein said product is retrieved from said storage means before said reading means reads said information, and wherein said product is in a first state when said product is produced and in a second state when said test is performed on said product.

11. A system as claimed in claim 10, wherein said product is produced at a first location and transported to a second location before said information storage device is affixed to said product.

12. The system as claimed in claim 10, wherein said product is concrete and the concrete is fluid in said first state and is solid in said second state.

13. The system as claimed in claim 12, wherein said concrete is formed into a test cube and said test is performed on a solid test cube.

14. The system as claimed in claim 12, wherein said preliminary test is a slump test.

15. The system as claimed in claim 14, wherein said test means performs a compression-strength test on said solid concrete.

16. The system as claimed in claim 15, wherein said system includes weighing means for weighing said product before said test means performs said test and storing the weight of said product in said database so that the weight of said product is associated with said test result and said information.

17. The system as claimed in claim 16, wherein said reading means reads said information when said product is located in a testing position where said test means can perform said test.

18. The system as claimed in claim 17, wherein the information in said information storage device cannot be altered after the information is written to said information said storage device by said writing means.

19. The system as claimed in claim 18, wherein the information written to the information storage device includes a time at which said information written to said information storage device.

20. The system as claimed in claim 19, wherein said identification data includes at least one of:
- a date delivery;
- a time of delivery;
- a customer name;
- a location of a customer's site;
- a product description;
- a delivery note number;
- an internal order number;
- an internal vehicle number;
- a register vehicle number;
- a total amount ordered;
- an amount of a load;
- an amount of the total amount ordered which has delivered;
- an amount of the total amount still to be delivered;
- additional charges;
- who issued the product; and
- who ordered the product.

21. The system as claimed in claim 20, wherein the information written to the information storage device includes at least one of:
- a date of making of a test cube;
- a time of making of a test cube;
- a slump test result;
- a grade; and
- a test cube number.

22. The system as claimed in claim 21, wherein said writing means generates a radio frequency information signal to write said information to said information storage device.

23. The system as claimed in claim 22, wherein said writing means is a hand held device.

24. The system as claimed in claim 23, wherein said reading means includes a reference signal generator and a receiver, and said information storage device includes retransmission means; wherein, in use, said reference signal generator generates a reference signal, so that said retransmission means contains the information stored on said information storage device to thereby produce an altered reference signal which is received by said receiver, whereafter said reading means extracts said information from said altered reference signal.

25. The system as claimed in claim 24, wherein said retransmission means is a passive device.

26. The system as claimed in claim 24, wherein said information means is a transponder.

27. The system as claimed in claim 26, wherein said signals are radio frequency signals.

28. The system as claimed in claim 27, wherein the product is a sample of said concrete which is tested to thereby monitor said concrete.

29. The system as claimed in claim 28, wherein a plurality of samples are tested.

30. The system as claimed in claim 28, wherein the compression strength of said concrete is monitored.

31. The system as claimed in claim 30, wherein the slump test result of said concrete is monitored.

32. The system as claimed in claim 31, wherein concrete from approximately one out of every six truck loads of concrete delivered to a site.

* * * * *